UNITED STATES PATENT OFFICE.

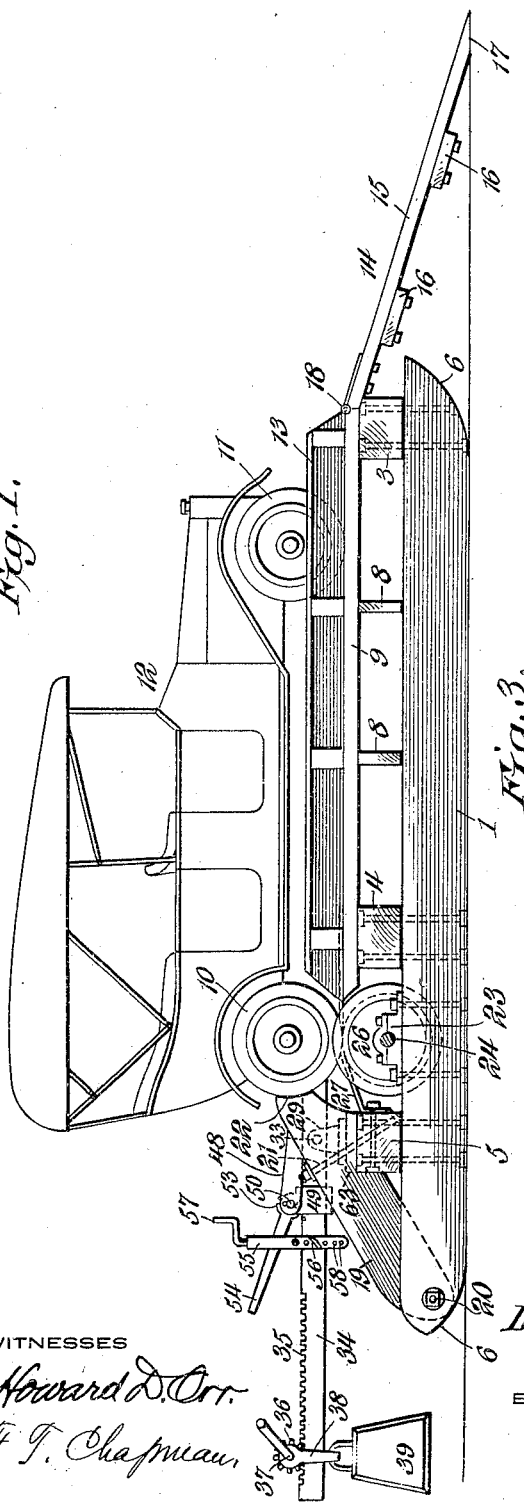

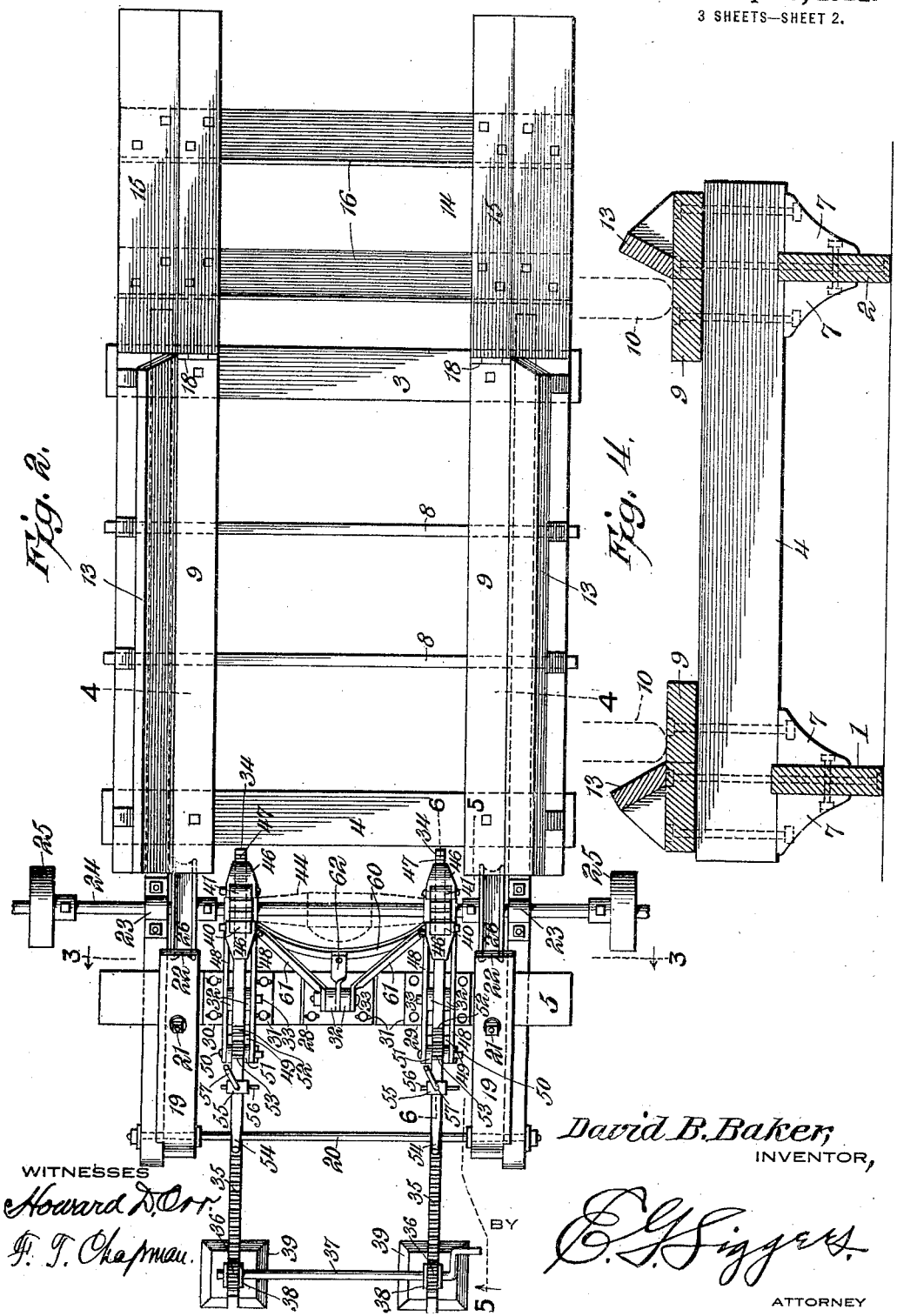

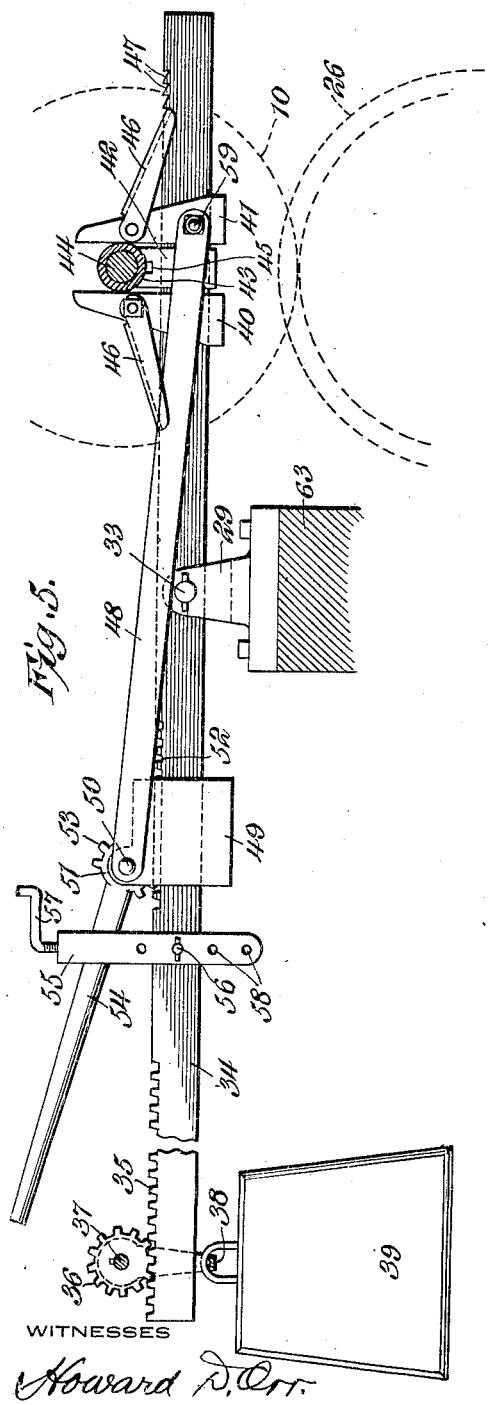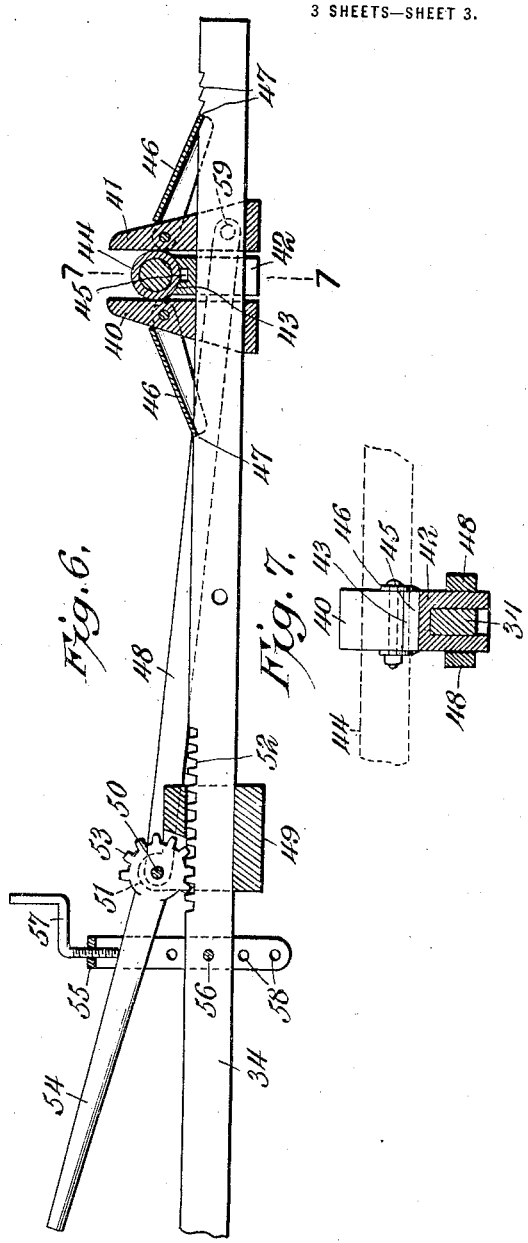

DAVID B. BAKER, OF HOQUIAM, WASHINGTON.

AUTO-JACK AND POWER-PLANT.

1,373,585.   Specification of Letters Patent.   Patented Apr. 5, 1921.

Application filed April 24, 1919. Serial No. 292,518.

*To all whom it may concern:*

Be it known that I, DAVID B. BAKER, a citizen of the United States, residing at Hoquiam, in the county of Grays Harbor and State of Washington, have invented a new and useful Auto-Jack and Power-Plant, of which the following is a specification.

This invention has reference to an auto jack and power plant, and its object is to provide a jack upon which an automobile may be run and which will so support the automobile that the power side of the latter may be driven without propelling the automobile but will propel mechanism on the jack to permit the transmission of power to mechanisms to be driven.

In accordance with the invention, there is provided a supporting structure which may be in the form of a sled, with runners to facilitate the transportation of the structure from place to place. The supporting structure carries a runway for an automobile and upon which the automobile may be drawn or driven and held in the desired position with the driving wheels of the automobile resting upon rollers, in turn mounted upon a shaft carrying pulleys or other means for the transmission of power to the machinery to be driven.

Provision is made for regulating the tractive effect of the automobile wheels upon the driven rollers in accordance with the force to be transmitted.

In the drawings:—

Figure 1 is a side elevation, with the power transmitting shaft in cross section, of a structure embodying the invention and showing an automobile in place.

Fig. 2 is a plan view of the structure shown in Fig. 1, with the automobile omitted.

Fig. 3 is a section on the line 3—3 of Fig. 2 and omitting some parts.

Fig. 4 is a section on the line 4—4 of Fig. 2, omitting distant parts.

Fig. 5 is a section on the line 5—5 of Fig. 2 and also omitting distant parts.

Fig. 6 is a detail section on the line 6—6 of Fig. 2.

Fig. 7 is a section on the line 7—7 of Fig. 6.

Referring to the drawings, there is shown a sled-like support comprising two runners 1 and 2 connected by cross beams 3, 4 and 5 respectively. Although but three cross beams are shown, it is to be understood that more than three cross beams may be employed if so desired.

The runners 1 and 2 have rounded ends 6 for facilitating transportation, and the connection of these runners with the cross beams is strengthened by brackets 7 or otherwise, the several parts being bolted together wherever necessary or desirable.

Mounted on the beams 3 and 4 and upon intermediate beams 8, when provided, are tracks 9 suitably spaced to receive and support the wheels 10, 11 of an automobile 12. The tracks 9 are provided with outer guards 13 which may have an outward flare as they rise from the tracks to safely guide the automobile and prevent injury to parts thereof when running onto the track. The support is of suitable height so that the tracks 9 are elevated to an appropriate extent above the ground or floor upon which the structure is placed. At one end of the supporting framework or structure there is provided a slanting approach 14 which may be conveniently formed of strips 15 and cross pieces 16 appropriately bolted or otherwise secured together. The lower end of the approach is beveled, as shown at 17, so as to lie flat upon the ground or upon a floor and to present no impediment to the running of the automobile onto the approach. At the upper end, the approach 14 is connected by hinges 18, or in other manner to the corresponding end of the support, thus permitting the approach to be folded up out of the way for the storage of the device, or the hinges may be disconnected, permitting the approach to be bodily removed for storage or transportation purposes.

Carried by the beam 5 are bumpers 19, each extending toward the end 6 of a respective runner 1 or 2, as the case may be, and there secured to the runner by a bolt 20. Where the bumper or stop 19 engages the beam 5 both the bumper and the beam are traversed by a bolt 21. The bumper slants upwardly from the beam, and at its high end is shaped, as shown at 22, to conform to the circumferential shape of the tire of the wheel 10 so that the automobile may be backed on the structure until stopped by the engagement of the rear wheels with the bumpers 19.

The tracks 9 stop short of the bumpers 19 by a suitable distance to accommodate certain structures. Each runner 1 and 2 carries a journal bearing 23 between the track and bumper and the journal bearings 23 are traversed by a shaft 24 extending transversely of the support and also beyond the journal bearings and the corresponding runners. The extended ends of the shaft are designed to carry pulleys 25 suitable for receiving belts to drive machinery, or these pulleys may be representative of any suitable power transmitting means. Mounted on the shaft 24 in line with the tracks 9 are grooved rollers 26, the grooving of the rollers being suitable to receive the tires of the automobile wheels 10. Fast to the beam 5 in line with each grooved roller 26 is a strap 27 extending forwardly over the grooved roller and onto the portion of the track 9 in line with the roller. When the automobile is backed upon the tracks until stopped by the bumpers 19 the rear wheels of the automobile first engage the free ends of the straps 27 and run along these straps until over the rollers 26, thus facilitating the transfer of the rear wheels of the automobile from the track onto the rollers. By holding the automobile from forward movement and rotating the rear wheels in a direction to drive the automobile forwardly, the straps 27 are moved from between the rollers 26 and the drive wheels 10 of the automobile so that as soon as the straps are disposed of, the drive wheels of the automobile come into contact with the grooved rollers and proceed to rotate the grooved rollers and with them the shaft 24. This is accomplished without shock or jar and without requiring any mechanism for lowering the automobile onto the grooved rollers or raising the latter into engagement with the drive wheels of the automobile and irrespective of gaps between the grooved rollers and adjacent ends of the tracks 9.

The beam 5 carries bearings 28, 29 and 30, each comprising a base plate 31 and upstanding spaced ears 32 through which latter a pivot pin 33 is passed. The bearings 29 and 30 each carry a lever 34, best shown in Figs. 5, 6 and 7, the bearing 29 or 30, as the case may be, serving as a pivot support for the lever and arranged at an intermediate point of the latter. One end of the lever is provided on its upper edge with rack teeth 35 with which engages a pinion 36 traversed by a crank shaft 37, best shown in Fig. 2. The shaft 37 is common to both pinions 36, there being a pinion for each lever 34. Hung from the crank shaft is a yoke 38 straddling the lever 34 and carrying at its lower end a weight 39. The other end of the lever from that provided with the rack teeth 35 extends through adjacent spaced jaws 40, 41 respectively. The jaws are shown in the drawings with the adjacent faces parallel and upright and with the opposite faces slanting so that the jaws are of tapering outline, but this particular shape is not obligatory. On each lever 34 between the jaws 40 and 41 there is lodged a block 42 having the upper end concaved, as shown at 43, to receive and support the rear axle 44 of the automobile. Since most automobiles have the rear axle provided with a truss rod the axle supporting end 43 of the block has a groove 45 formed therein to accommodate the usual truss rod.

The two jaws 40 and 41 and the block 42 are capable of sliding lengthwise of the lever 34 and each jaw 40 and 41 carries a stop member 46 pivoted at one end to the respective jaw and shaped at the other end to straddle the upper edge of the lever 34 which has notches 47 formed therein to receive those ends of the stops 46 remote from the jaws 40 and 41. The jaw 41 is connected by links 48 on opposite sides to a slide 49 carried by the lever 34, which latter may traverse the slide, and a pivot pin 50 connects the links 48 to ears 51 rising from the slide above the upper edge of the lever 34. Where the slide 49 is movable along the lever 34 there is formed a series of rack teeth 52 to receive a circularly arranged series of teeth 53 on one end of a handle 54 traversed by the pivot pin 50, which pin is concentric to the teeth 53. By rocking the handle 54 the slide 49 may be made to travel along the lever 34 for an appropriate distance, whereby the jaw 41 is moved lengthwise of the lever 34. The other jaw 40 may be moved by hand along the lever 34. When the slide 49 is in a desired position it may be there held by a clip 55 straddling the handle 54 and connected to and supported by the lever 34 by means of a pin 56 traversing the legs of the clip 55 and the lever. A crank set screw 57 threaded through the yoke end of the clip 55 may be brought into engagement with the handle 54 to thereby set and hold the handle in the position in which it is placed. The legs of the clip 55 are provided with a series of matching perforations 58 for adjustment purposes. That end of each link 48 remote from the pivot 50 is held to the jaw 41 by a pin or screw 59.

Each jaw 40 is connected to one end of a cross bar 60 shown in Fig. 2, the bar 60 being appropriately bent or curved to avoid contact with the differential casing of the automobile. This cross bar serves to prevent side movements of the automobile when used for power purposes and to further stiffen and strengthen the parts a brace 61 extends from each end of the bar 60 to the bearing 28 where these braces are held to the ears 32 by the pivot pin 33. Another brace 62 is held by the same pin 33 between the ears 32 of the bearing 28 and is riveted or otherwise made fast to an intermediate part of the bar 60. In order to support the bearings 29 and 30 at a suitable height, they may be carried upon a timber 63 supported by the beam 5 and the bearing 28 may be further carried by a block 64 on the timber 63.

When the automobile is to be used for power purposes, the weight 39 is moved toward the pivot or fulcrum of the lever 34 so that the other end of the lever may be lowered sufficiently to bring the jaws 40 and 41 below the level of the axle 44 of the automobile, whereupon, the automobile may be run upon the approach 14 and onto the tracks 9 until stopped by the bumper 19. Then the weights 39 are moved by means of the crank shaft 37 away from the pivots of the levers to bring the jaws 40 and 41 to opposite sides of the axle 44. The handles 54 are then operated to move the jaws 41 toward the jaws 40, the latter being already braced in position by the stops 46 carried thereby, and, by suitably proportioning the parts, the jaws 41 are made to clamp the axle against the jaws 40, while the handles 54 are locked by the set screws 57, thus holding the parts from dislodgment. The blocks 42 serve as supports for the axle 44 and through it for the rear of the automobile, and when the automobile engine is started and the rear wheels of the automobile are rotated forwardly, the straps 27 are propelled out of the way and the weight of the automobile is borne by the grooved rollers 26. This weight may be more or less counterbalanced by the movable weights 39 so that for light loads the wear upon the running parts may be reduced by correspondingly counterbalancing the weight of the automobile. For heavy loads the full weight of the automobile may be used.

After the automobile is properly set the stops 19 are moved out of the way so that the wheels 10 do not engage them. This is accomplished by loosening or removing the bolts 21 and turning the stops upon the pivot bolts 20 for a sufficient distance.

The invention is advantageous, particularly about a farm, in that an automobile may be used as the power unit and furnish ample power for various devices usually found upon a farm, the power furnished being sufficient for sawing, grinding, churning, driving corn shellers, fanning mills, and the like. The jack of the invention may be used either with a passenger automobile or with a truck, the latter being usually capable of delivering more power than the passenger automobile.

What is claimed is:—

1. A structure for the purpose described, comprising a support, a power transmission shaft journaled on the support, rollers on the shaft and shaped to receive and sustain the driving wheels of an automobile, tracks on the support for receiving the automobile and guiding the driving wheels onto the rollers, and bumpers on the support on the sides of the rollers remote from the tracks, said bumpers being provided with readily removable fastening means, whereby they may be moved out of engagement with the automobile wheels.

2. A structure for the purpose described, comprising a support, power transmitting means carried by the support in position to be engaged by the driving wheels of an automobile when on the support, rockable levers on the support, clamping means movable along the levers for engaging the rear axle of the automobile when driving the power transmitting means to prevent progressive movement of the automobile, means for holding the clamping means in adjusted positions, and means for rocking the levers.

3. A structure for the purpose described, comprising a support, power transmitting means carried by the support in position to be engaged by the driving wheels of an automobile when on the support, rockable levers on the support, means on the levers for engaging the rear axle of the automobile when driving the power transmitting means to prevent progressive movement of the automobile, and means for rocking the levers, said means comprising counterweights movable along the levers.

4. A structure for the purpose described, comprising a support, a power shaft on the support with rollers in position to be engaged by the driving wheels of an automobile when on the support, levers on the support with means for engaging the rear axle of the automobile to hold the automobile from progressive movement while driving the rollers, a counterweight for each lever, and rack and pinion means, in part on the levers and in part carrying the weights, for adjusting the weights lengthwise of the levers to vary the counterbalancing effect of said weights.

5. A structure for the purpose described, including a support, a power shaft on the support with rollers in position to be engaged by the driving wheels of an automobile when on the support, levers on the support provided with means for engaging the rear axle of the automobile to hold the same from progressive movement while driving the rollers, a rack provided on each lever, a pinion engaged with each rack, a crank shaft traversing said pinions and fixed thereto, and a counterweight carried by each pinion.

6. A structure for the purpose described, comprising a support, a power shaft and rollers thereon, with the rollers in position to be engaged by the drive wheels of an automobile when on the support, levers mounted on the support and each provided with jaws for engaging the rear axle of the automobile, one of the jaws being fixable on the lever, and means for moving the other jaw toward the first jaw to grip the axle between them.

7. A structure for the purpose described, comprising a support, a shaft on the support having rollers, said rollers being engageable by the drive wheels of an automobile, levers pivotally mounted on the support and provided with clamping means for the rear axle of the automobile, said clamping means including a pair of jaws with a block between them for supporting said axle.

8. A structure for the purpose described, comprising a support, a shaft on the support having rollers, said rollers being engageable by the drive wheels of an automobile, levers pivotally mounted on the support and provided with clamping means for the rear axle of the automobile, said clamping means including a pair of jaws slidably mounted on each lever, and a slidably mounted block between the jaws for supporting said axle.

9. A structure for the purpose described, comprising a support, a shaft on the support having rollers, said rollers being engageable by the drive wheels of an automobile, levers pivotally mounted on the support and provided with clamping means for the rear axle of the automobile, said clamping means including a pair of jaws slidably mounted on each lever, and stop means associated with each jaw to prevent separating movement thereof.

10. A structure for the purpose described, comprising a support, a shaft on the support having rollers, said rollers being engageable by the drive wheels of an automobile, levers pivotally mounted on the support and provided with clamping means for the rear axle of the automobile, said clamping means including a pair of jaws slidably mounted on each lever, stop members pivotally mounted on each jaw, and notches on the lever engageable with each stop member for preventing the slidable jaws from separating.

11. A structure for the purpose described, comprising a support, a shaft on the support having rollers, said rollers being engageable by the drive wheels of an automobile, levers pivotally mounted on the support and provided with clamping means for the rear axle of the automobile, said clamping means including a pair of jaws movably mounted on the lever, a link secured to one of said jaws, a slide on the lever secured to said link, a handle engaging with the lever and swingably mounted on the slide for adjusting the longitudinal position of the slide, and means for holding the handle in the desired position.

12. A structure for the purpose described, comprising a support, a power shaft and rollers thereon, with the rollers in position to be engaged by the drive wheels of an automobile when on the support, levers mounted on the support and each provided with jaws for engaging the rear axle of the automobile, one of the jaws being fixable on the lever, and means for moving the other jaw toward the first jaw to grip the axle between them, said means comprising a slide on each lever connected to the movable jaw, and rack and pinion adjusting means for the slide.

13. A structure for the purpose described, comprising a support, a power shaft having rollers thereon, said rollers being engageable by the drive means of an automobile when on the support, levers mounted on the support and each provided with jaws for engaging the rear axle of the automobile, one of said jaws being fixable on the lever, and means for moving the other jaw toward the first jaw to grip the axle between them, said means comprising a slide on each lever connected to the movable jaw, rack and pinion adjusting means for the slide, said rack and pinion adjusting means including a rack on the lever, a handle on the slide with gear teeth engaging the rack, and locking means for the handle.

14. A structure for the purpose described, comprising a support, a power shaft and rollers thereon, with the rollers in position to be engaged by the drive wheels of an automobile when on the support, levers mounted on the support and each provided with jaws for engaging the rear axle of the automobile, one of the jaws being fixable on the lever, and means for moving the other jaw toward the first jaw to grip the axle between them, said means comprising a slide on each lever connected to the movable jaw, rack and pinion adjusting means for the slide, said rack pinion adjusting means including a rack on the lever, a handle on the slide with gear teeth engaging the rack, and locking means for the handle comprising a clip with means for making it fast to the lever and a set screw device for engaging the handle when traversing the clip.

15. A structure for the purpose described, comprising a support, a shaft journaled on the support and provided with rollers in position to be engaged by the driving wheels of an automobile on the support, levers mounted on the support, with each lever having clamping jaws for engaging the rear axle of the automobile to hold the drive wheels on the rollers against displacement therefrom, bracing means carried by a fixed part of the support and engaging one of each pair of jaws on the levers, and means on the levers for adjusting the other jaw of each pair into clamping relation to the axle lodged between the jaws.

In testimony that I claim the foregoing as my own I have hereto affixed my signature.

DAVID B. BAKER.

Witnesses:
R. E. DAWDY,
Jo. H. SMITH.